ис007475190B2

(12) United States Patent
Hoover et al.

(10) Patent No.: US 7,475,190 B2
(45) Date of Patent: Jan. 6, 2009

(54) DIRECT ACCESS OF CACHE LOCK SET DATA WITHOUT BACKING MEMORY

(75) Inventors: Russell D. Hoover, Rochester, MN (US); Eric O. Mejdrich, Rochester, MN (US); Sandra S. Woodward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 10/961,752

(22) Filed: Oct. 8, 2004

(65) Prior Publication Data

US 2006/0080398 A1      Apr. 13, 2006

(51) Int. Cl.
*G06F 15/167* (2006.01)
*G06F 12/00* (2006.01)

(52) U.S. Cl. .................... 711/118; 709/216; 709/213; 711/145; 711/128; 711/153; 711/129; 711/113

(58) Field of Classification Search ................ 709/213; 711/118, 145, 128, 142, 129, 153, 121, 152, 711/141; 714/736; 345/513, 503, 521, 557; 710/108

See application file for complete search history.

(56) References Cited

U.S. PATENT DOCUMENTS

| | | | | |
|---|---|---|---|---|
| 3,848,234 A | * | 11/1974 | MacDonald | ............... 711/119 |
| 5,317,716 A | * | 5/1994 | Liu | ............. 711/144 |
| 5,581,705 A | | 12/1996 | Passint et al. | |
| 5,588,110 A | * | 12/1996 | DeKoning et al. | ............ 714/5 |
| 5,692,152 A | * | 11/1997 | Cohen et al. | ............... 711/140 |
| 5,809,525 A | * | 9/1998 | Bishop et al. | .............. 711/122 |
| 5,813,030 A | * | 9/1998 | Tubbs | ...................... 711/118 |
| 5,841,973 A | | 11/1998 | Kessler et al. | |
| 5,890,217 A | * | 3/1999 | Kabemoto et al. | ........... 711/141 |
| 5,909,696 A | * | 6/1999 | Reinhardt et al. | ............ 711/144 |
| 6,006,299 A | * | 12/1999 | Wang et al. | ................ 710/108 |
| 6,055,605 A | * | 4/2000 | Sharma et al. | ............. 711/130 |
| 6,124,868 A | * | 9/2000 | Asaro et al. | ................ 345/558 |
| 6,363,438 B1 | | 3/2002 | Williams et al. | |
| 6,449,699 B2 | | 9/2002 | Franke et al. | |
| 6,725,296 B2 | | 4/2004 | Craddock et al. | |
| 6,791,555 B1 | * | 9/2004 | Radke et al. | ................ 345/532 |
| 6,799,247 B1 | * | 9/2004 | Batcher | ..................... 711/118 |
| 6,801,207 B1 | * | 10/2004 | Tischler et al. | ............. 345/557 |
| 6,801,208 B2 | * | 10/2004 | Keshava et al. | ............ 345/557 |
| 6,820,143 B2 | | 11/2004 | Day et al. | |
| 6,820,174 B2 | | 11/2004 | Vanderwiel | |
| 7,023,445 B1 | * | 4/2006 | Sell | ............................ 345/557 |
| 2002/0004876 A1 | * | 1/2002 | Timmer et al. | ................. 711/3 |
| 2002/0103988 A1 | * | 8/2002 | Dornier | ...................... 712/38 |
| 2002/0112129 A1 | * | 8/2002 | Arimilli et al. | ............. 711/141 |
| 2002/0156977 A1 | * | 10/2002 | Derrick et al. | ............. 711/118 |
| 2003/0005380 A1 | * | 1/2003 | Nguyen et al. | ............. 714/736 |
| 2003/0135742 A1 | * | 7/2003 | Evans | ........................ 713/189 |

(Continued)

*Primary Examiner*—Reginald G. Bragdon
*Assistant Examiner*—Victor W Wang
(74) *Attorney, Agent, or Firm*—Patterson & Sheridan LLP

(57) ABSTRACT

Methods for quickly accessing data residing in a cache of one processor, by another processor, while avoiding lengthy accesses to main memory are provided. A portion of the cache may be placed in a lock set mode by the processor in which it resides. While in the lock set mode, this portion of the cache may be accessed directly by another processor without lengthy "backing" writes of the accessed data to main memory.

1 Claim, 4 Drawing Sheets

U.S. PATENT DOCUMENTS

| | | |
|---|---|---|
| 2003/0163642 A1* | 8/2003 | Borkenhagen et al. ...... 711/121 |
| 2004/0117592 A1 | 6/2004 | Day et al. |
| 2004/0162946 A1 | 8/2004 | Day et al. |
| 2004/0263519 A1 | 12/2004 | Andrews et al. |
| 2006/0080398 A1* | 4/2006 | Hoover et al. ............... 709/213 |

* cited by examiner

| MEMORY MAP | |
|---|---|
| ADDRESS | DESCRIPTION |
| 0x000000XX<br>↓<br>0x00FFFFXX | MAIN MEMORY |
| 0x010000XX<br>↓<br>0x01FFFFXX | L2 CACHE LOCK SET |

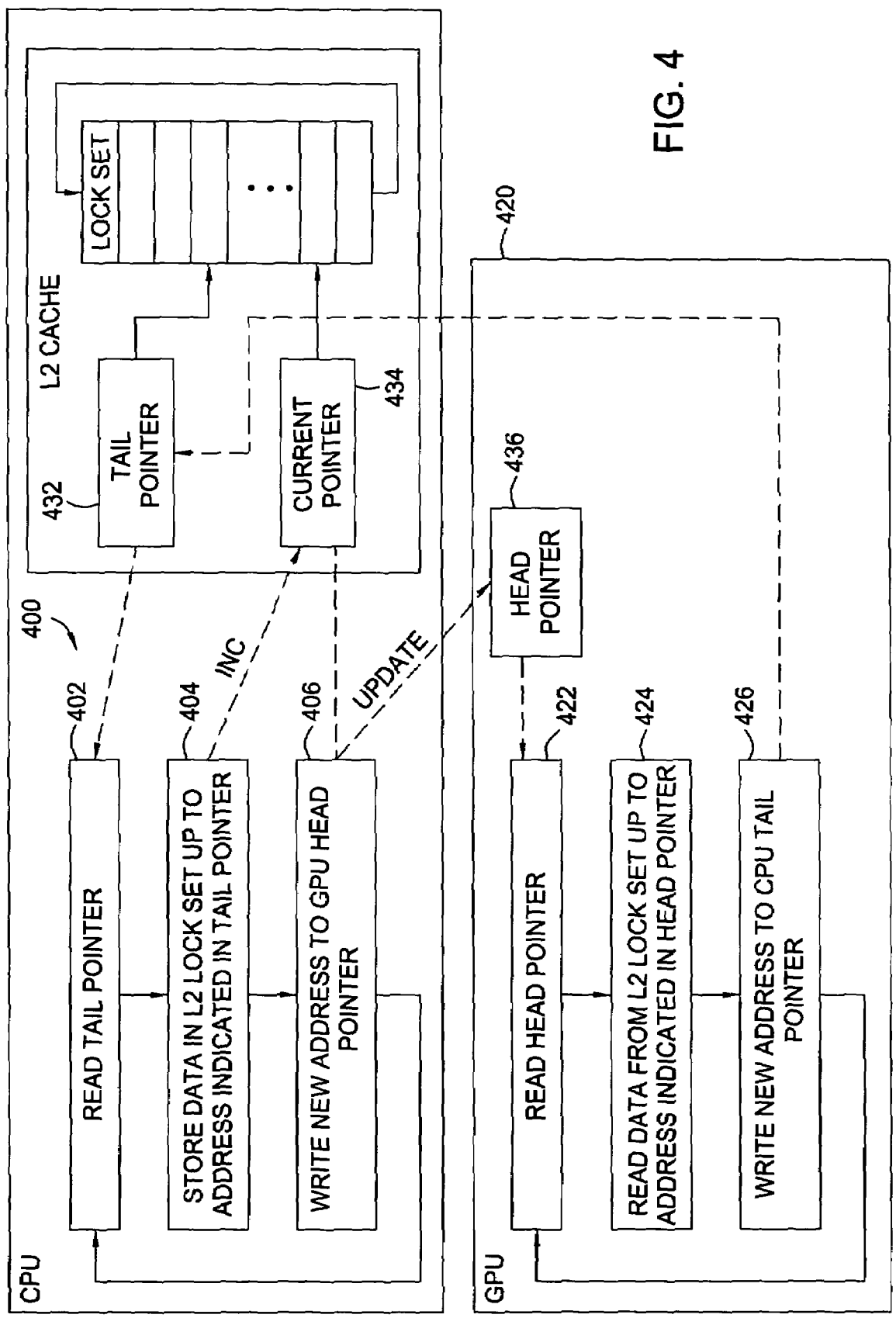

DIRECT ACCESS OF CACHE LOCK SET DATA WITHOUT BACKING MEMORY

BACKGROUND OF THE INVENTION

1. Field of the Invention

This application is related to commonly owned U.S. Patent applications entitled "Enhanced Bus Transactions for Efficient Support of a Remote Cache Directory Copy" (U.S. Ser. No. 10/961,742), "Low Latency Coherency Protocol for a Multi-Chip Multiprocessor System" (U.S. Ser. No. 10/961,751), "Graphics Processor With Snoop Filter" (U.S. Ser. No. 10/961,750), "Snoop Filter Directory Mechanism in Coherency Shared Memory System" (U.S. Ser. No. 10/961,749), which are herein incorporated by reference.

2. Description of the Related Art

Computer systems have been used for over 50 years to process digital information. Over that time, computers have developed into high speed devices that can process tremendous amount of information at high speeds and at low cost in a remarkable number of applications. However, new applications that demand even higher performance at lower cost continue to emerge.

One approach to achieving higher performance is to utilize multiple processors in a system, such as one or more central processing units (CPUs) and one or more graphics processing units (GPUs). The CPUs typically utilize one or more high speed caches to provide high speed local access to data being currently manipulated, thus avoiding relatively slow accesses to external main memory. Many highly computationally intensive applications involve transferring data, locally cached by one processor, to another processor.

For example, real-time rendering of graphical images is highly computationally intensive. Input data for the graphics processors is commonly produced by one or more of the CPUs. For example, the CPUs may produce or modify graphics primitives (utilized by the GPU) which thus reside in the CPU caches. Therefore, in such multiprocessor systems, this cached data is often transferred from the CPU to the GPU. Conventionally, this data transfer has been relatively slow as the data is first written to main memory (for backing) instead of directly between the processors, in an effort to maintain coherency.

Accordingly, there is a need for an improved method and system for speeding the transfer of data between processors, for example, without any actual backing of the data in external memory.

SUMMARY OF THE INVENTION

Embodiments of the present invention generally provide methods for transfers of data in a shared cache between multiple processors.

One embodiment provides a method of transferring data between multiple processors without writing the data to external memory. The method generally includes allocating a plurality of cache lines of a cache residing on a first processor for use in a lock set and storing, by the first processor, data in one or more cache lines allocated to the lock set. The method further includes providing, by the first processor, an indication of the availability of the data stored in the one or more cache lines and transferring data stored in the one or more cache lines from the first processor to the second processor without writing the data stored in the one or more cache lines to the external memory.

Another embodiment provides a method for transferring data generated by a central processing unit (CPU) to a graphics processing unit (GPU) without writing the generated data to external memory. The method generally includes allocating a plurality of cache lines of a cache residing on the CPU for use in a lock set and storing, by the CPU, data in one or more cache lines allocated to the lock set. The method further includes providing, by the CPU, an indication to the GPU of the availability of the data stored in the one or more cache lines, receiving, by the CPU, a request from the GPU for data stored in one or more cache lines allocated to the lock set. The requested data is transferred to the GPU and processed by the GPU without writing the requested data to the external memory.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a flow diagram of exemplary operations for lock set access in accordance with embodiments of the present invention;

DETAILED DESCRIPTION OF THE PREFERRED EMBODIMENTS

The principles of the present invention provide for quickly accessing data residing in a cache of one processor, by another processor, while avoiding lengthy accesses to main memory. For some embodiments, a portion of the cache may be placed in a lock set mode by the processor in which it resides. While in the lock set mode, this portion of the cache may be accessed directly by another processor without lengthy "backing" writes of the accessed data to main memory.

In the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

An Exemplary System

Figure 1:
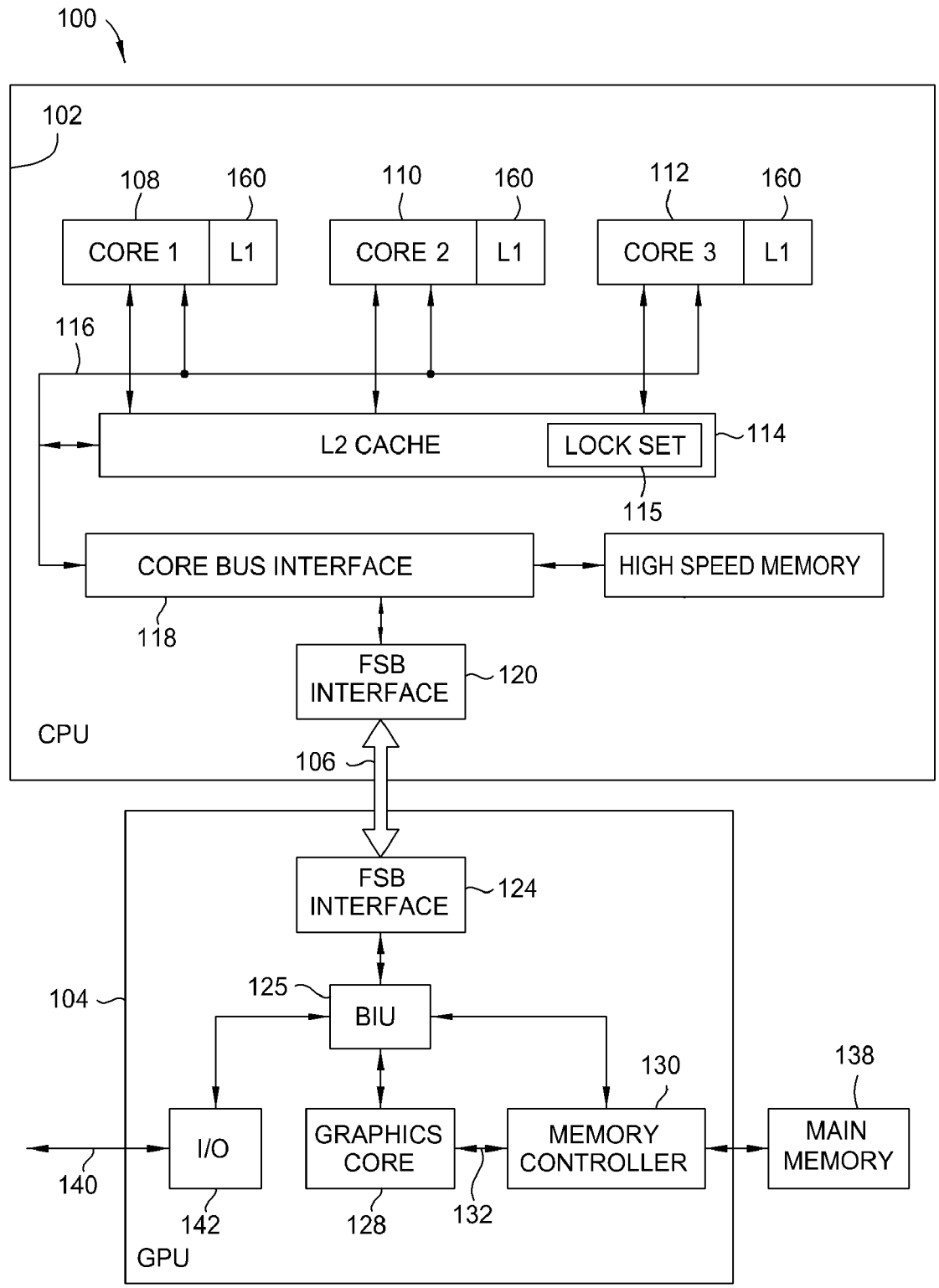
FIG. 1 illustrates an exemplary system in accordance with embodiments of the present invention.

FIG. 1 schematically illustrates an exemplary multi-processor system 100 in which a portion (lock set 115) of an L2 cache 114 residing on a first processor (illustratively, a CPU 102) can be accessed directly by a second processor (illustratively, a GPU 104), without lengthy writes to main memory 138. FIG. 1 illustrates a graphics system in which main memory 138 is near a graphics processing unit (GPU) and is accessed by a memory controller 130 which, for some embodiments, is integrated with (i.e., located on) the GPU. For other embodiments, the system 100 may include an external memory controller or a memory controller integrated with a central processing unit (CPU). In any case, it should be noted that the techniques described herein with reference to directly accessing cache memories generally apply to any such configuration.

As shown, the system 100 includes a CPU 102 and a GPU 104 that communicate via a front side bus (FSB) 106. The CPU 102 illustratively includes a plurality of processor cores 108, 110, and 112 that perform tasks under the control of software. The processor cores may each include any number of different type function units including, but not limited to arithmetic logic units (ALUs), floating point units (FPUs), and single instruction multiple data (SIMD) units. Examples of CPUs utilizing multiple processor cores include the Power PC line of CPUs, available from IBM.

Each individual core may have a corresponding L1 cache 160 and may communicate over a common bus 116 that connects to a core bus interface 118. For some embodiments, the individual cores may share an L2 (secondary) cache memory 114. The core bus interface 118 communicates with the L2 cache memory 114, and carries data transferred into and out of the CPU 102 via the FSB 106, through a front-side bus interface 120.

The GPU 104 also includes a front-side bus interface 124 that connects to the FSB 106 and that is used to pass information between the GPU 104 and the CPU 102. The GPU 104 is a high-performance video processing system that processes large amounts of data at very high speed using sophisticated data structures and processing techniques. To do so, the GPU 104 includes at least one graphics core 128 that processes data (obtained from main memory 138 or the CPU 102) via a memory controller 130. The memory controller 130 connects to the graphics front-side bus interface 124 via a bus interface unit (BIU) 125. Data passes between the graphics core 128 and the memory controller 130 over a wide parallel bus 132. Connected to the memory controller 130 is a large main memory 138. The main memory 138 stores operating routines, application programs, and corresponding data that implement the operation of the system 100 in accord with the principles of the present invention.

For some embodiments, the GPU 104 may also include an I/O port 140 that connects to an I/O driver 142. The I/O driver 142 passes data to and from any number of external devices, such as a mouse, video joy stick, computer board, and display. The I/O driver 142 properly formats data and passes data to and from the graphic front-side bus interface 124. That data is then passed to or from the CPU 102 or is used in the GPU 104, possibly being stored in the main memory 138 by way of the memory controller 130. As illustrated, the graphics cores 128, memory controller 130, and I/O driver 142 may all communicate with the BIU 125 that provides access to the FSB via the GPU's FSB interface 124.

As previously described, for some applications, the CPU may generate data for use by the GPU 104. For example, the CPU may be used to pre-process data (e.g., performing complex mathematical operations) to generate graphics primitives for an image to be displayed on some type of display device by the GPU 104. In such applications, the CPU processed data may be stored in the L2 cache 114. Such data is typically consumed by the GPU 104 and not processed further by any other processor. As a result, backing such data to main memory 138 may not be necessary and, in fact, may only result in additional latency in accessing the data by the GPU 104.

Direct Access of Cache Lock Set Data

Accordingly, for such embodiments, latency associated with accessing the cached data by the GPU 104 may be reduced by allowing the GPU 104 to access a portion of the cache 114 containing the data (lock set 115) directly from the CPU 102, without backing the cached data to main memory 138.

Figures 2A, 2B:
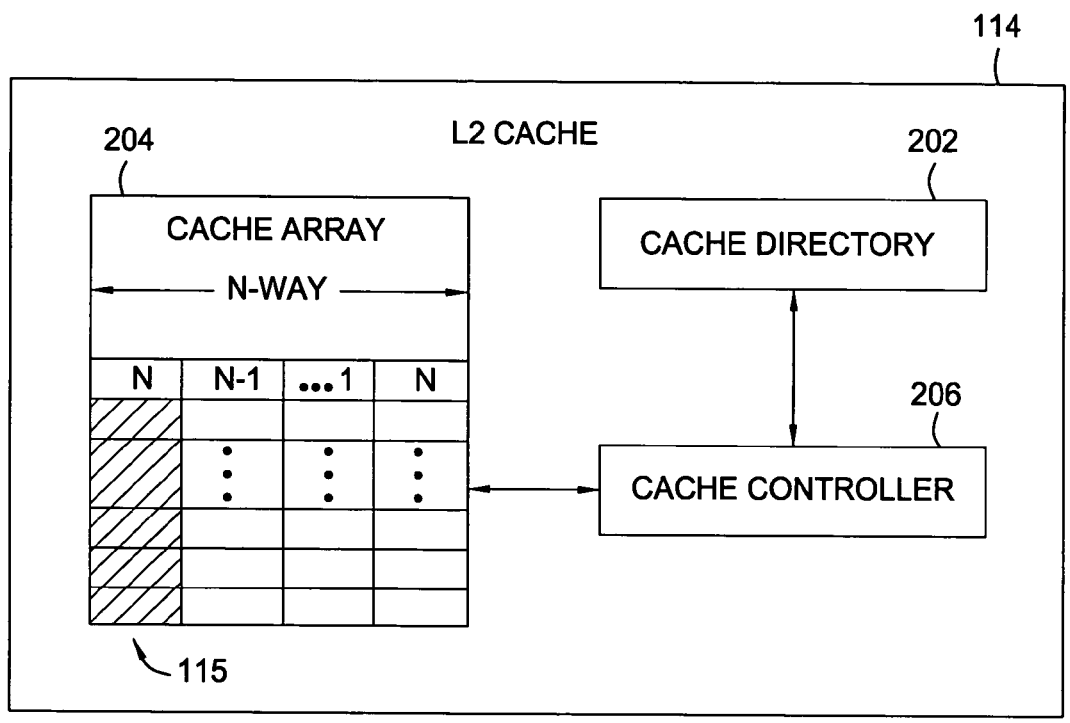
FIGS. 2A and 2B illustrate an exemplary L2 cache configuration and an exemplary lock set address mapping, respectively, in accordance with embodiments of the present invention.

As illustrated in FIG. 2A, for some embodiments, the cache 114 may comprise a cache directory 202, a set associative cache array 204, and a cache controller 206. As is well known, memory locations in main memory 138 may be mapped to particular associative sets 203 within the array 204 utilizing predetermined index bits within the system memory addresses. The addresses of the particular cache lines 205 stored within the array 204 are recorded in the cache directory 202, which typically contains one entry for each cache line in the array 204. Each entry in the directory 202 may include a tag field, which specifies the particular cache line stored in the array 204, and a state field indicating the coherency state of the cache line (e.g., Modified, Exclusive, Shared, or Invalid states in accordance with the well known MESI coherency protocol).

When receiving a request for data from a processing core, the cache controller 206 may first examine the contents of the cache directory 204 for a match with an address supplied in the request to determine if a cache line containing the requested data is in the cache array 204. If so, the cache controller may return the cached data to the requesting processing core. Otherwise, the cache controller 206 may initiate a request to main memory 138.

As illustrated, for some embodiments, a lock set 115 may be specified as one "way" spanning multiple associative sets of the cache array. Alternatively, a lock set may span a portion or all of one or more associative sets. In any case, in accordance with aspects of the present invention, to establish the lock set 115, the cache 114 may be placed in a direct mapped mode during which a set of cache lines are allocated for the lock set 115.

As illustrated in FIG. 2B, the cache lines in an L2 cache lock set may be mapped to some range of addresses that are non-overlapping with main memory. In other words, data written, by processor instruction, to the address range allocated to the lock set may be routed directly to the corresponding portion of cache, rather than external memory.

Figure 3:
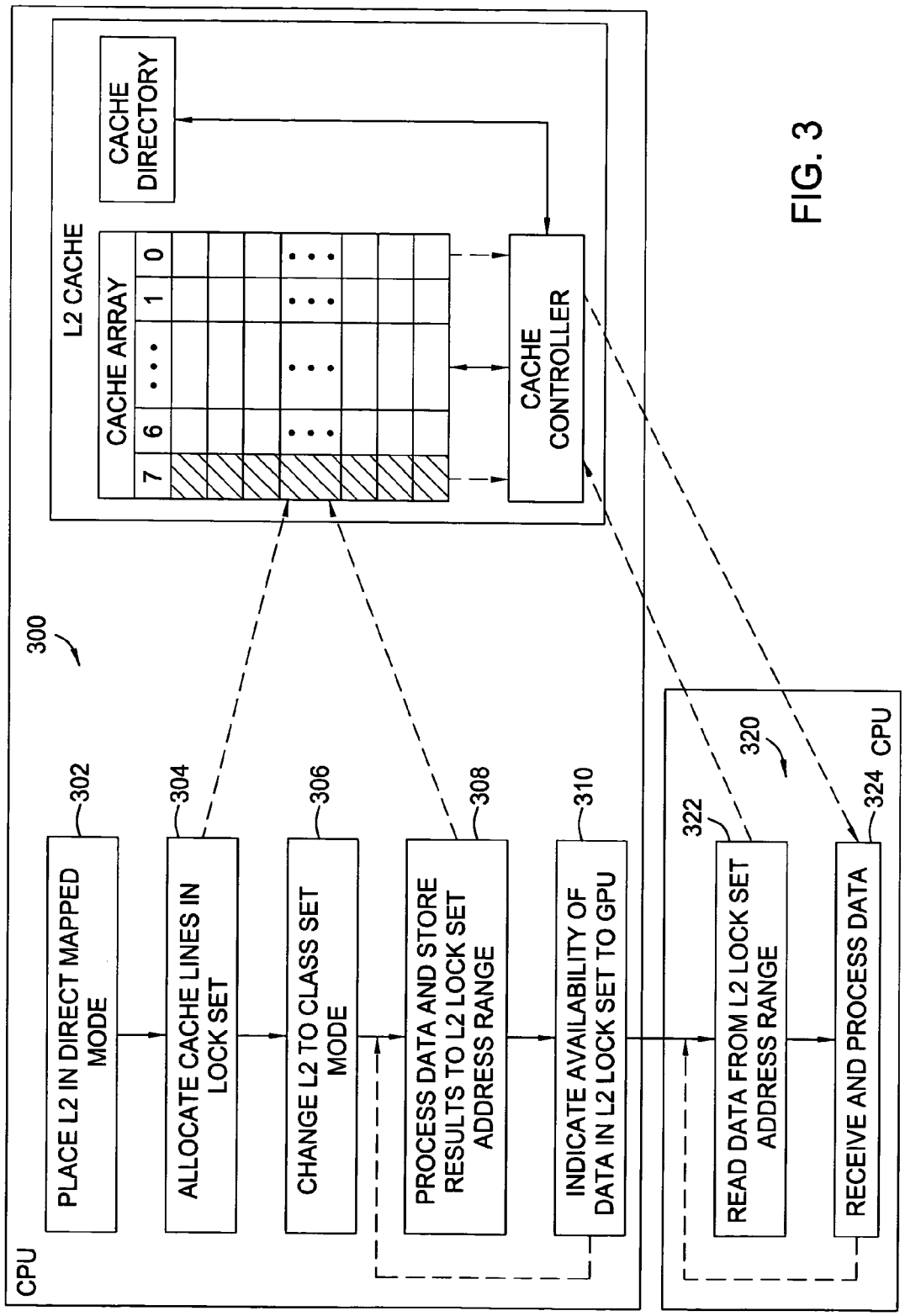
FIG. 3 is a flow diagram of exemplary operations for lock set initialization and access in accordance with embodiments of the present invention.

FIG. 3 is a flow diagram of exemplary operations for lock set initialization and access in accordance with one embodiment of the present invention. As illustrated, the CPU 102 performs a set of operations 300 to initialize the lock set and modify data stored therein, while the GPU 104 performs another set of operations 320 to access that data.

The operations 300 begin, at step 302, by placing the L2 cache 114 in a direct mapped mode. In this direct mapped mode, cache lines to be allocated in the lock set may be addressed directly (e.g., using addresses in a range reserved for lock set cache lines as per FIG. 2B). At step 304, cache lines for the lock set are allocated. For some embodiments, cache lines for the lock set may be allocated by issuing a cache instruction, such as a data cache block set to zero (DCBZ) instruction. For example, a DCBZ instruction may be issued for each cache line to be allocated to the lock set. Accordingly, the number of DCBZ instructions may depend on how many cache lines are to be contained in the lock set, while the addresses specified with the DCBZ instructions may determine which portion of the cache 114 is used as the lock set. As a result of these operations, the state for each cache line in the lock set may transition from invalid to modified (e.g., as the DCBZ instructions effectively constituted a store of zeros).

At step 306, the cache may be placed in a class set mode. The cache may be placed in the class set mode so the non-locked sets of the cache can be used for storage operations with addresses that are not in the locked set address range. With the lock set initialized, the CPU begins to process data, at step 308, and store results in the lock set address range. At step 310, the CPU indicates the availability of data in the lock set to the GPU. As illustrated, the operations 308 and 310 may be repeated as necessary, for example, as the CPU 102 continues to process data for the GPU 104.

At step 322, the GPU 104 reads data directly from the lock set address range. These reads may be executed using Read With No Intent to Cache (RWNITC) requests, so that the coherency state of the requested cache line may remain unchanged (e.g., in the Modified state). As a result, because the state does not change to Shared, a cast out of the requested cache line (and associated latency) may be avoided. At step 324, the GPU receives and processes the data. As illustrated, the operations 322 and 324 may be repeated as necessary, until all the necessary data has been retrieved from the L2 cache lock set 115 and processed. In other words, as the CPU 102 continues to process and generate new data, the GPU 104 may continue to read and further process this data.

For some applications, the total amount of data processed by the CPU 102 for the GPU 104 may exceed the cache lines allocated for the lock set 115. Accordingly, for some embodiments, the lock set 115 may be operated in a first-in, first-out (FIFO) manner allowing the CPU 102 to overwrite locations after they have been read by the GPU 104. In such embodiments, data stored in the lock set 115 may be passed between the CPU 102 and the GPU 104 using a head pointer and tail pointer scheme.

According to this scheme, the CPU 102 writes, to a head pointer on the GPU 104, an "end" address of data that has been updated and is ready to be read. In response, the GPU 104 may begin reading data from the L2 cache up to the address indicated by the head pointer. The GPU 104 may periodically write, to a tail pointer on the CPU 102, the address up to which the GPU 104 has read, in effect, notifying the CPU 102 that it may overwrite data up to this point (considering the pointers as circular). FIG. 4 is a flow diagram of exemplary operations (400 and 420 performed by the CPU 102 and GPU 104, respectively) for transferring data directly between the CPU 102 and GPU 104, via the lock set 115, utilizing head and tail pointers.

The CPU operations 400 begin, at step 402, by reading a current value of a tail pointer 432, which indicates to what address the CPU may write. For example, the tail pointer 432 may contain a value indicating an address up to which the GPU 104 has read data from the lock set 115. In other words, the CPU 102 may safely store data up to this address without fear of overwriting data the GPU 104 has not yet read. At step 404, the CPU 102 stores data in the lock set 115 up the address indicated by the tail pointer 432. At step 406, the CPU 102 writes a new address to a GPU 104 head pointer 436 (e.g., the value of a pointer 434 pointing to the last location in the lock set 115 modified by the CPU 102).

The GPU operations 420 begin, at step 422, by reading the head pointer 436, which indicates up to what lock set address the GPU 104 may read (without re-reading the same data). At step 424, the GPU reads data up to the address indicated by the head pointer 436. At step 426, the GPU 104 writes a new address to the CPU tail pointer 432. For example, if the GPU 104 has read up to the address stored in the head pointer 436, the GPU 104 may write the same address back to the tail pointer on the CPU 102. The operations 400 and 420 may be repeated as the CPU 102 and GPU 104 continue to process data, all without incurring the conventional latency associated with backing such data to external memory.

CONCLUSION

By utilizing a cache lock set with a reserved address space, data cached by one processor may be rapidly accessed by another processor, without accessing main memory. As a result, significant performance improvements may be achieved, particularly for applications in which large amounts of data are transferred from one processor to another, such as in a graphic processing system with a CPU processing data to be transferred to a GPU.

Embodiments of the present invention are implemented as program products for use with computer systems such as, for example, the system 100 shown in FIG. 1. Those programs define functions of the embodiments (including the operations described above) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

While the foregoing is directed to embodiments of the present invention, other and further embodiments of the invention may be devised without departing from the basic scope thereof, and the scope thereof is determined by the claims that follow.

What is claimed is:

1. A method of transferring data generated by a central processing unit (CPU) to a graphics processing unit (GPU) without writing the generated data to external memory, comprising:
   allocating a plurality of cache lines of a cache residing on the CPU for use in a lock set, wherein the plurality of cache lines comprise less than a total number of cache lines of the cache;
   storing, by the CPU, data in one or more cache lines allocated to the lock set;
   providing, by the CPU, an indication to the GPU of the availability of the data stored in the one or more cache lines;

receiving, by the CPU, a request from the GPU for data stored in one or more cache lines allocated to the lock set;

without writing the data stored in the one or more cache lines to the external memory, transferring the data stored in the one or more cache lines from the CPU to a processing core within the GPU and processing the data by the GPU;

wherein providing, by the CPU, an indication to the GPU of the availability of the data stored in the one or more cache lines comprises writing, by the CPU, a value to a pointer on the GPU;

wherein receiving, by the CPU, a request from the GPU for data stored in one or more cache lines allocated to the lock set comprises receiving a request to read with no intent to cache (RWNITC); and wherein a memory controller is integrated with the GPU; and receiving, by the memory controller, a request for data from a processing core of the GPU and routing the request to the CPU or an external memory depending on an address supplied with the request, wherein routing the request to the CPU or external memory depending on the address supplied with the request comprises:

routing the request to the CPU if the address falls within a first address range reserved for the lock set; and routing the request to the external memory if the address falls within a second address range reserved for the external memory.

* * * * *